(No Model.)
W. KELLY.
HARROW.
No. 259,869. Patented June 20, 1882.
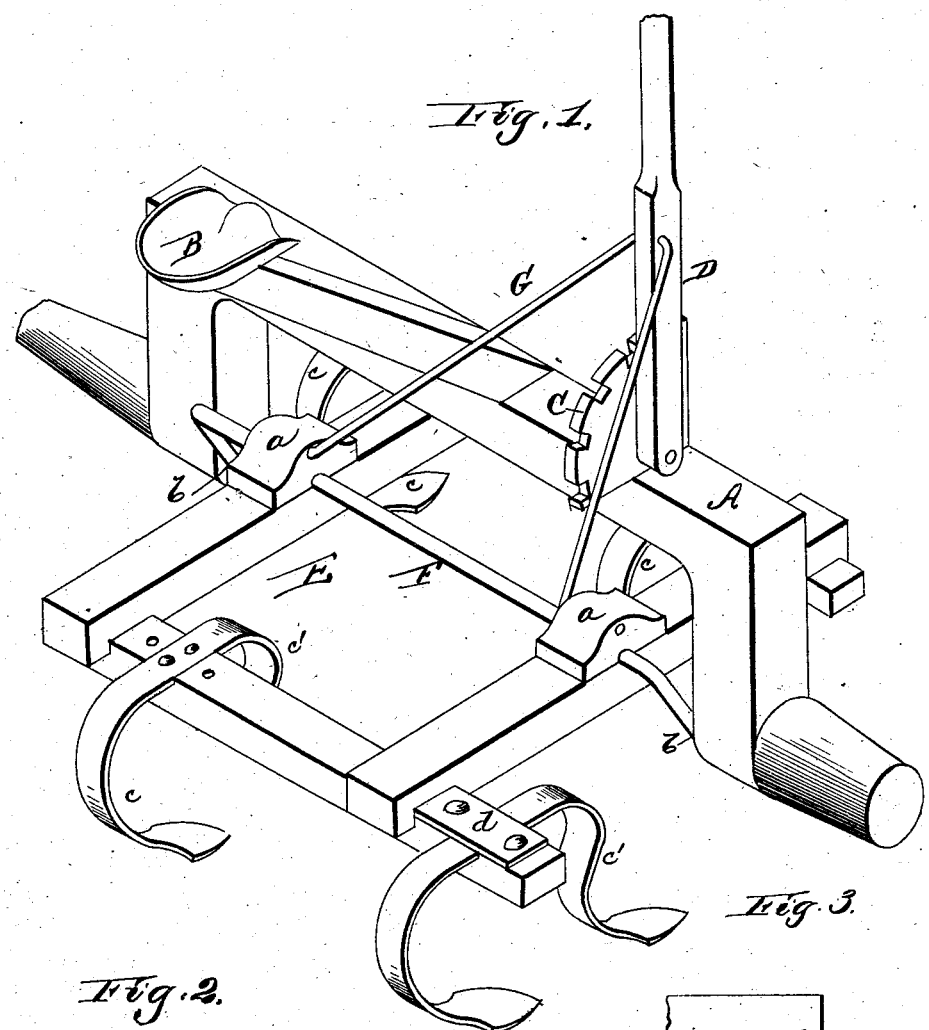
Witnesses:
Inventor:
Wm. Kelly
per J. W. Alexander
Attorney.

UNITED STATES PATENT OFFICE.

WILLIAM KELLY, OF SARANAC, MICHIGAN.

HARROW.

SPECIFICATION forming part of Letters Patent No. 259,869, dated June 20, 1882.

Application filed February 6, 1882. (No model.)

*To all whom it may concern:*

Be it known that I, WILLIAM KELLY, of Saranac, in the county of Ionia and State of Michigan, have invented certain new and useful Improvements in Harrows; and I do hereby declare that the following is a full, clear, and exact description thereof, reference being had to the accompanying drawings, and to the letters of reference marked thereon, which form part of this specification, in which—

Figure 1 is a perspective view of my harrow. Fig. 2 is a detail view of one of the teeth. Fig. 3 is a sectional view of one end of the arched axle and its arm, showing one end of the bail pivoted thereto.

This invention relates to certain novel improvements on the harrow for which Letters Patent were granted to me bearing date August 31, 1880, and numbered 231,816; and it consists in the combination and arrangement of parts hereinafter set forth and claimed.

The following description will enable others skilled in the art to fully understand my improvements.

A designates an arched axle, which is designed for two transporting-wheels, and which has mounted on it the driver's seat B, a toothed segment, C, and a hand-lever, D. This hand-lever is provided with a latch for engaging with the toothed segment for the purpose of holding the harrow-frame in working position or in a raised position free from the ground.

In practice I may use more than one harrow-section; but for the purpose of this description a single section, as shown in the drawings, will be sufficient.

E designates the harrow-frame, which is rectangular and composed of transverse and longitudinal beams rigidly bolted together. This frame is pivotally connected by means of blocks *a a* to a long bail, F, the horizontal ends *b b* of which are free to oscillate in bearings formed in the axle A, which bearings are concentric to the axes of the transporting-wheels. Hence the vibration of the axle while passing over undulating surfaces will not raise or depress the harrow or cause its teeth to dig into the soil or to leave the same. Directly above the axis of motion of the harrow-frame, on its adjustable bail F, the ends of another bail, G, are pivotally connected to the two blocks *a a*, which latter bail is made of a single rod, bent as shown, and pivotally connected to the lever-handle. By this manner of attaching the lever-handle to the harrow-frame the latter is free to vibrate and accommodate itself to the inequalities of surfaces passed over when the lever-handle is locked fast to its segment, and while this is the case the harrow-frame is taken hold of at the middle of its length by the bail G when it is lifted or depressed.

The harrow-teeth are made in pairs or twins—that is to say, a strip of spring metal of a suitable width and length and possessing the required degree of stiffness is pointed at both ends in a suitable manner. The strip from the middle of its length is then curved backward and downward, (reference being had to the drawings hereto annexed for description,) forming the rear tooth, *c*. The front tooth, *c'*, is then formed by bending the front portion of the strip so as to give it somewhat the form of a plain ogee or the letter S reversed. The spring-strip is then placed in a recess in the top of a transverse beam of the harrow, and secured by means of bolts and covered by a plate, *d*, held by bolts. It will be seen that the front tooth, *c'*, of each pair of teeth, which has the heaviest work to perform, is stiffer, and is arranged nearly in a vertical line with the harrow-beam, to which it is secured, and that the strain is supported by this beam, while the rear tooth or follower has but one bow or curve, is very flexible, and is held down on said harrow-beam by the bolts and cap-fastenings above described.

Having thus fully described my invention, what I claim as new, and desire to secure by Letters Patent, is—

In a wheel-harrow, the combination of the arched axle A, having the arms rigidly fixed to it, the locking-lever D on this axle, the bail G, pivoted to lever D, the blocks *a a* on the suspended frame E, having bail G pivoted to them, the bail F, pivoted to said frame directly below the pivotal ends of bail G, and also pivoted to the axle, the front and rear transverse bars of frame E, and the double harrow-teeth crossing the tops of said bars and secured to them by plates *d*, all substantially as described.

In testimony that I claim the foregoing as my own I affix my signature in presence of two witnesses.

WILLIAM KELLY.

Witnesses:
 JEROME BROWN,
 E. C. SHAW.